(12) United States Patent
Mecklin et al.

(10) Patent No.: US 10,261,834 B2
(45) Date of Patent: Apr. 16, 2019

(54) METHOD AND NETWORK NODE FOR SELECTING A MEDIA PROCESSING UNIT BASED ON A MEDIA SERVICE HANDLING PARAMETER VALUE

(71) Applicant: Telefonaktiebolaget LM Ericsson (publ), Stockholm (SE)

(72) Inventors: Tomas Mecklin, Kyrkslätt (FI); Jouni Mäenpää, Nummela (FI); Miljenko Opsenica, Espoo (FI); Tommi Roth, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 39 days.

(21) Appl. No.: 15/105,717

(22) PCT Filed: Dec. 18, 2013

(86) PCT No.: PCT/SE2013/051550
§ 371 (c)(1),
(2) Date: Jun. 17, 2016

(87) PCT Pub. No.: WO2015/094039
PCT Pub. Date: Jun. 25, 2015

(65) Prior Publication Data
US 2017/0024259 A1    Jan. 26, 2017

(51) Int. Cl.
*G06F 9/50* (2006.01)
*G10L 15/34* (2013.01)
(Continued)

(52) U.S. Cl.
CPC .......... *G06F 9/5044* (2013.01); *G06F 9/5055* (2013.01); *G06F 9/5027* (2013.01);
(Continued)

(58) Field of Classification Search
None
See application file for complete search history.

(56) References Cited

U.S. PATENT DOCUMENTS 7,809,813 B2 * 10/2010 Ma ................. G06F 17/3089
709/223
8,495,187 B2 * 7/2013 Kim ................ H04L 12/2805
709/206
(Continued)

FOREIGN PATENT DOCUMENTS

CN        103238317 A     8/2013
EP        2592550 A1      5/2013
(Continued)

OTHER PUBLICATIONS

Korotich et al, A Novel Architecture for Efficient Management of Multimedia-Service Clouds, 2011, IEEE, pp. 1-5 (Year: 2011).*
(Continued)

*Primary Examiner* — Abu Ghaffari
(74) *Attorney, Agent, or Firm* — Sage Patent Group

(57) ABSTRACT

A method for selecting a media processing unit performed in a network node of a distributed cloud. The distributed cloud comprises two or more media processing units that handle media processing required by a media service. The method includes receiving, from a communication device, a request for the media service and obtaining, for each media processing unit, at least one configurable parameter value of a parameter relating to handling of the media service. The method also includes selecting, based on the at least one parameter value, a media processing unit for processing the requested media service for the communication device.

22 Claims, 6 Drawing Sheets

(51) Int. Cl.
*H04L 29/08* (2006.01)
*H04W 4/60* (2018.01)

(52) U.S. Cl.
CPC .............. *G10L 15/34* (2013.01); *H04L 67/10* (2013.01); *H04W 4/60* (2018.02)

(56) References Cited

U.S. PATENT DOCUMENTS

| | | | | |
|---|---|---|---|---|
| 8,725,063 | B2* | 5/2014 | Krampf | H03J 1/0025 |
| | | | | 455/3.05 |
| 8,990,305 | B2* | 3/2015 | Barkley | H04L 12/1827 |
| | | | | 370/260 |
| 9,330,167 | B1* | 5/2016 | Pendar | G06F 17/30705 |
| 2004/0107099 | A1* | 6/2004 | Charlet | G10L 17/12 |
| | | | | 704/234 |
| 2008/0031277 | A1* | 2/2008 | Walter | H04L 41/12 |
| | | | | 370/469 |
| 2008/0189617 | A1* | 8/2008 | Covell | G06F 17/3089 |
| | | | | 715/738 |
| 2009/0271829 | A1* | 10/2009 | Larsson | H04H 60/58 |
| | | | | 725/82 |
| 2011/0061086 | A1* | 3/2011 | Huang | H04N 21/234309 |
| | | | | 725/110 |
| 2011/0131335 | A1 | 6/2011 | Spaltro et al. | |
| 2012/0131178 | A1* | 5/2012 | Zhu | H04L 67/1004 |
| | | | | 709/224 |
| 2012/0282983 | A1* | 11/2012 | Koike | H04M 1/021 |
| | | | | 455/575.3 |
| 2013/0138814 | A1* | 5/2013 | Kotecha | H04L 67/10 |
| | | | | 709/226 |
| 2013/0182002 | A1* | 7/2013 | Macciola | H04N 1/387 |
| | | | | 345/589 |
| 2013/0268575 | A1* | 10/2013 | Xu | G06F 3/048 |
| | | | | 709/202 |
| 2014/0317167 | A1* | 10/2014 | Wahl | H04L 41/12 |
| | | | | 709/201 |

FOREIGN PATENT DOCUMENTS

| | | |
|---|---|---|
| WO | 2009072094 A2 | 6/2009 |
| WO | 2011143438 A1 | 11/2011 |

OTHER PUBLICATIONS

Office Action and Search Report for Chinese Application No. 201380081695.4, dated Dec. 25, 2018, 16 pages.

* cited by examiner

*prior art*

|  | Latency to this DC[ms] | Avg E2E Latency to other users[ms] | Load of MS cluster[%] | Relative cost of DC | Avg jitter to other users[ms] | Levels in the three if using this DC | Avg packet loss to other users[%] | Trans-rating supported by DC | Throughput to first hop DC[mbps] |
|---|---|---|---|---|---|---|---|---|---|
| Weight | 1 | 5 | 4 | 3 | 4 | 2 | 2 | 4 | 5 |
| Quality | - | - | - | - | - | - | - | - | - |
| Relative Weight | -0,0333 | -0,1667 | -0,133 | -0,1 | -0,13333 | -0,06667 | -0,067 | 0,1333333 | 0,166667 |
| Score |  |  |  |  |  |  |  |  |  |
| Beijing | 50 | 138 | 90 | 0,5 | 20 | 4 | 0,003 | 0 | 5 |
| Frankfurt | 150 | 238 | 50 | 1 | 30 | 3 | 0,002 | 1 | 2 |
| Kansas City | 100 | 188 | 25 | 0,4 | 40 | 3 | 0,001 | 1 | 3 |
| Sum | 300 | 564 | 165 | 1,9 | 90 | 10 | 0,006 | 2 | 10 |
| Normalized score |  |  |  |  |  |  |  |  |  |
| Beijing | 0,1667 | 0,24468 | 0,5455 | 0,26316 | 0,22222 | 0,4 | 0,5 | 0 | 0,5 |
| Frankfurt | 0,5 | 0,42199 | 0,303 | 0,52632 | 0,33333 | 0,3 | 0,3333 | 0,5 | 0,2 |
| Kansas City | 0,3333 | 0,33333 | 0,1515 | 0,21053 | 0,44444 | 0,3 | 0,1667 | 0,5 | 0,3 |
| Weighted normalized score |  |  |  |  |  |  |  |  |  |
| Beijing | -0,0056 | -0,0408 | -0,073 | -0,0263 | -0,02963 | -0,02667 | -0,033 | 0 | 0,083333 |
| Frankfurt | -0,0167 | -0,0703 | -0,04 | -0,0526 | -0,04444 | -0,02 | -0,022 | 0,0666667 | 0,033333 |
| Kansas City | -0,0111 | -0,0556 | -0,02 | -0,0211 | -0,05926 | -0,02 | -0,011 | 0,0666667 | 0,05 |
| Result | SUM of weighted scores |  |  |  |  |  |  |  |  |
| Beijing | -0,15 |  |  |  |  |  |  |  |  |
| Frankfurt | -0,17 |  |  |  |  |  |  |  |  |
| Kansas City | -0,08 |  |  |  |  |  |  |  |  |

Fig. 11

METHOD AND NETWORK NODE FOR SELECTING A MEDIA PROCESSING UNIT BASED ON A MEDIA SERVICE HANDLING PARAMETER VALUE

TECHNICAL FIELD

The technology disclosed herein relates generally to the field of distributed cloud environments, and in particular to selection of a media processing unit for media processing in such environments.

BACKGROUND

In a traditional centralized cloud environment, all computing is executed in one centralized large data center. In contrast, in a distributed cloud environment, there is no single central data center. Instead, the distributed cloud consists of a potentially high number of geographically dispersed data centers. These data centers have heterogeneous capabilities; some of the data centers may be relatively small and be located at the edge of a network comprising the distributed cloud environment, whereas others may be located at the core of the network and be provided with a very capacity.

Traditionally, Unified Communications (UC) services such as multiparty audio and video conferencing have been provided using dedicated server hardware and Digital Signal Processors (DSPs). Today, there is an increasing trend to migrate hardware-based UC solutions to a fully software-based, virtualized cloud environment. The first step in this migration is to provide software-based UC services in a centralized cloud environment. The next foreseen step is to provide them in a distributed cloud environment.

FIG. 1 shows a simple example of media processing in a distributed cloud environment, in the following also referred to as network 1. In the figure, the distributed cloud 2 is providing a video conferencing service for four users, Users A, B, C, and D. Media processing is distributed in the cloud 2 in such a way that there are local Media Server (MS) 3A, 3B, 3D instances located close to the users at the edge of the network 1. Further, the audio mixing and switching for the conference is being handled by a Media Server 3 in a large data center at the core of the network 1. Each Media Server instance is running in one Virtual Machine (VM) within a data center 4A, 4B, 4D,4.

A reason for media processing needs to be distributed to several virtual machines is that typically, the capacity of a single virtual machine is not sufficient for handling the media processing for all the users in a conference. This is very much the case for instance in a high definition video conference where users may be using different codecs and thus transcoding is required to translate between the different media formats. A reason for distributing the media processing to virtual machines in different data centers is that when media processing occurs as close to the conference participants as possible, latencies can be minimized for users located close to the local media server. Further, responsiveness can be maximized. Latencies need to be minimized to improve the quality of experience for the users of the service. An example of maximized responsiveness is the ability to dynamically adapt the bitrates of the video streams being sent towards the user using feedback from the local Radio Access Network (RAN). Yet another benefit of connecting users to the network-wise closest data center is that the connectivity between the data centers is typically managed, whereas the connectivity of the users might be best effort. Thus, it makes sense to minimize the distance that the media streams travel over the best-effort connections.

The need to distribute media processing to several virtual machines located in different data centers can result in a highly complex interconnection topology for a media session, e.g. a multimedia conference session. Due to the possibly high number of virtual machines and data centers involved, the resulting topology is typically significantly more complex than media processing topologies utilized in the case of hardware-based media servers or in the case of media servers running in a non-distributed cloud environment. Therefore, choosing an optimal media processing topology for a multimedia session is a non-trivial problem.

One approach could be to implement support for only one or a few topologies and to use the same initially selected topology throughout a multimedia session, for example connecting new users and media servers to the network by connecting every new user to the geographically closest media server and connecting every media server to the same central server located in the middle of a star topology. A drawback of this approach is that the initial topology choice may not remain optimal throughout the lifetime of the multimedia session. Further, this may not always result in optimal quality of experience for the users. This approach further scales very poorly to complex geographically distributed cloud environments. As an example, a full mesh topology may quickly run into scalability problems as the number of media servers participating in the topology grows. As another example, a central server located in the middle of a star topology may also become a bottleneck as the number of other media servers connecting to it grows.

Using an inefficient or inappropriate media processing topology can result in increased latency, jitter, and packet loss and thus deteriorated quality for the media session. These problems are emphasized in global geographically distributed multimedia sessions since latency, jitter, and packet loss tend to increase with increased complexity and network distance between the communicating endpoints.

SUMMARY

An object of the present disclosure is to solve or at least alleviate at least one of the above mentioned problems.

The object is according to a first aspect achieved by a method for selecting a media processing unit performed in a network node of a distributed cloud. The distributed cloud comprises two or more media processing units configurable to handle media processing required by a media service. The method comprises: receiving, from a communication device, a request for the media service; obtaining, for each media processing unit, at least one configurable parameter value of a parameter relating to handling of the media service; and selecting, based on the at least one parameter value, a media processing unit for processing the requested media service for the communication device.

The method for selecting enables the construction of an improved media processing topology for a media service, e.g. a multimedia conference, running in a distributed cloud environment. A service provider can define policies based on which the topology is constructed. The policies can be defined in a flexible manner by the configurable one or more parameter values. Policies can be either complex, wherein multiple policies are applied simultaneously, or simple wherein only one policy, such as "always choose the lowest-cost alternative", is applied. The media processing topology can thereby be optimized in view of one or more configurable parameters that are set by the service provider. Further, the method enables the achieving of a high Quality of Experience (QoE) level, e.g. in view of low delay, low jitter, and low packet loss despite of the fact that media processing occurs on virtualized media servers in a highly dynamic geographically distributed cloud environment. The method may also be used to dynamically adjust an already existing media processing topology.

The object is according to a second aspect achieved by a network node for selecting a media processing unit of a distributed cloud. The distributed cloud comprises two or more media processing units configurable to handle media processing required by a media service. The network node comprises a processor and memory, the memory containing instructions executable by the processor, whereby the network node is operative to: receive, from a communication device, a request for the media service; obtain, for each media processing unit, at least one configurable parameter value of a parameter relating to handling of the media service; and select, based on the at least one parameter value, a media processing unit for processing the requested media service for the communication device.

The object is according to a third aspect achieved by a computer program for a network node for selecting a media processing unit of a distributed cloud, wherein the distributed cloud comprises two or more media processing units configurable to handle media processing required by a media service. The computer program comprises computer program code, which, when run on the network node causes the network node to: receive, from a communication device, a request for the media service; obtain, for each media processing unit, at least one configurable parameter value of a parameter relating to handling of the media service; and select, based on the at least one parameter value, a media processing unit for processing the requested media service for the communication device.

The object is according to a fourth aspect achieved by a computer program product comprising a computer program above, and a computer readable means on which the computer program is stored.

Further features and advantages of the present disclosure will become clear upon reading the following description and the accompanying drawings.

BRIEF DESCRIPTION OF THE DRAWINGS

FIG. 11 illustrates a Table 1 that shows an example of the scoring process for the three data centers assuming the above mentioned policies (i.e. parameters).

DETAILED DESCRIPTION

Figure 1:
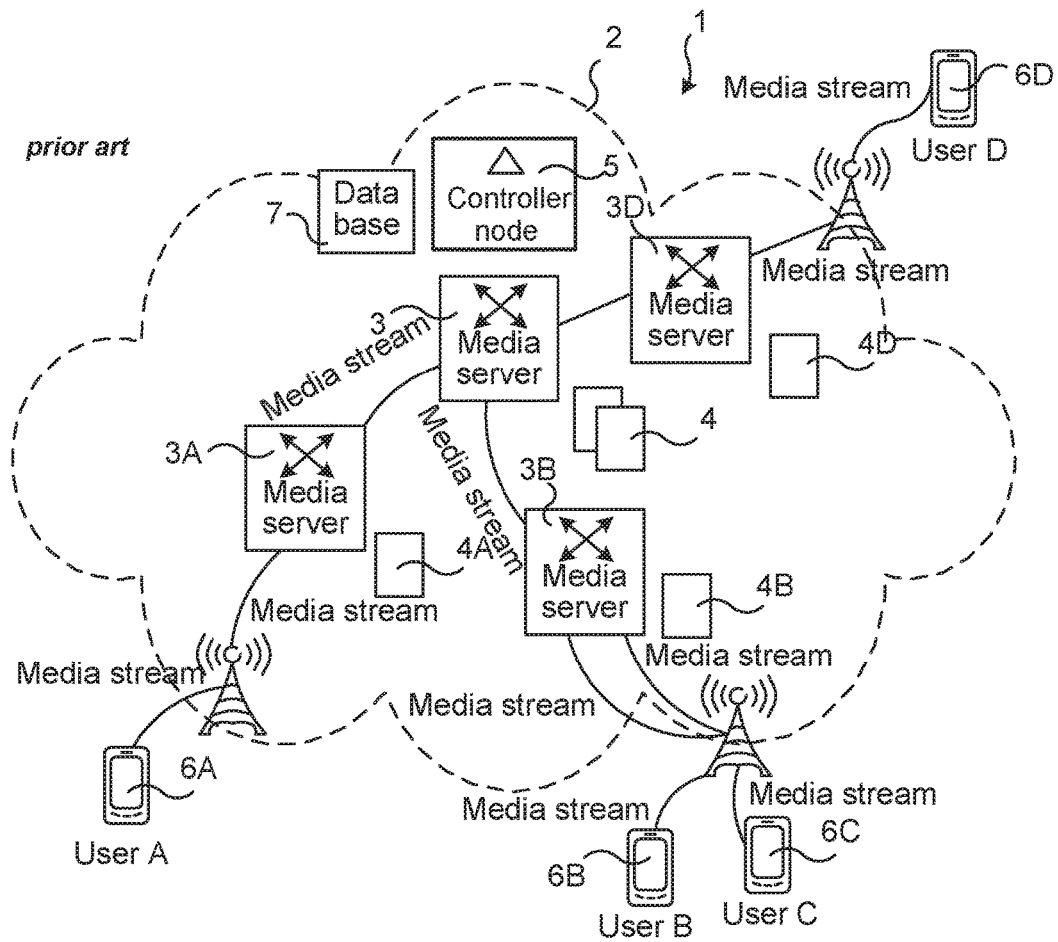
FIG. 1 illustrates schematically distributed cloud environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As discussed in the background section, the need to distribute media processing to several virtual machines in different data centers creates a more complex interconnection setup for a media session compared e.g. to the use of a single data center. This interconnection between network elements for media processing, such as the media servers 3, 3A, 3B, 3C of FIG. 1, is in the following referred to as the media processing topology. Some examples of such media processing topologies are given in FIGS. 2-5. In these figures, each node represents a media server. End users connect to media servers for sending and receiving real-time media streams.

Figure 2:
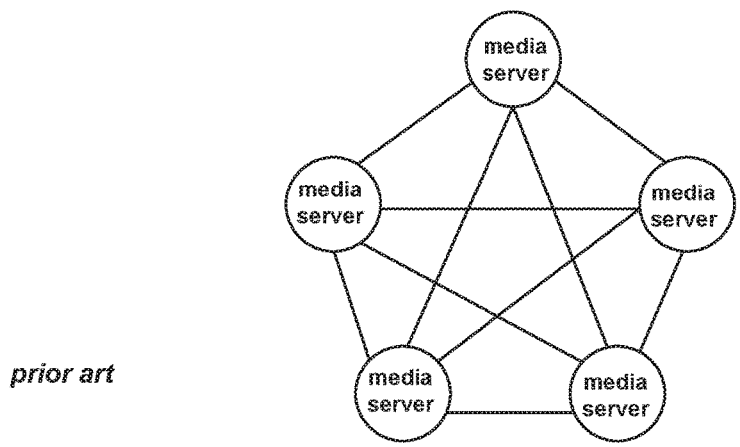
FIG. 2 illustrates a full mesh topology.

FIG. 2 shows an example of a full mesh topology. In a full mesh topology, every single media server instance connects to every other media server instance.

Figure 3:
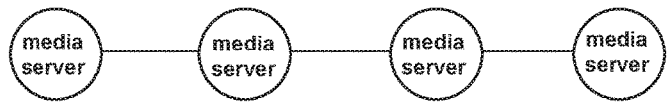
FIG. 3 illustrates a chain topology.

FIG. 3 illustrates a chain topology. In this topology, the media servers form a chain in which the first media server connects to the second media server, the second media server connects to a third media server, the third media server connects to a fourth media server, and so forth, until the final media server at the end of the chain is reached.

Figure 4:
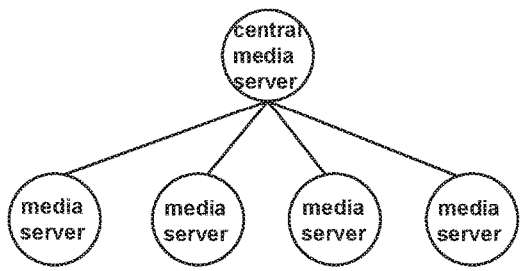
FIG. 4 illustrates a star topology.

FIG. 4 shows a star topology. In the star topology, every media server instance connects to the same central media server instance that thus becomes the center of the start topology.

Figure 5:
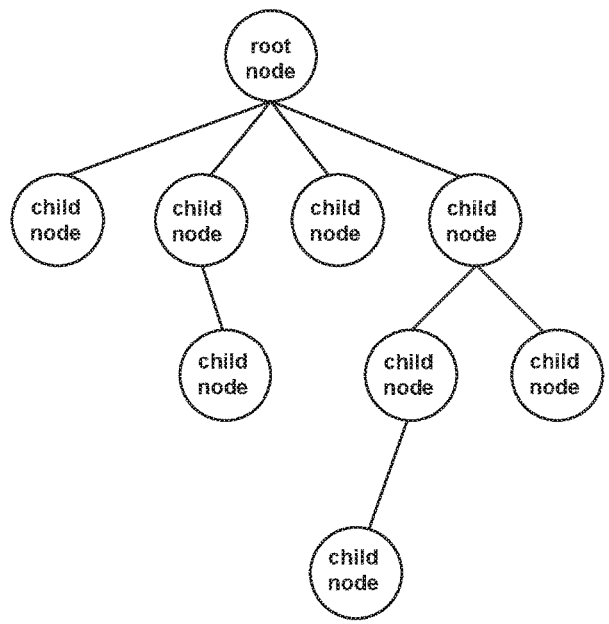
FIG. 5 illustrates a tree topology.

FIG. 5 illustrates a tree topology. In a tree topology, there is a root node that has a number of child nodes. The child nodes can have children of their own. The final level of child nodes in the tree, which do not have any further children, are called leaf nodes.

Reverting briefly to FIG. 1 it is noted that the network 1, and in particular the distributed cloud 2, also comprises a controller node 5 (also denoted CTRL in the figure), that is connected to all of the media servers 3, 3A, 3B, 3D in order to control them. Such controller node 5 is also included in the example scenario illustrated in FIG. 6 and described later, the controller node 5 being connected to media servers 10, 11, 12.

Even though latencies are short when users behind the same distributed media server instance are communicating with each other, media streams between users at different ends of the chain of media servers represented by the media processing topology may experience long delays. This is simply due to the fact that when the media streams from user A to user B go via multiple media servers, the processing done by each individual media server adds to the end-to-end delay that the Real-time Transport Protocol (RTP) packets carrying the media experience. As an example, if the media goes through a chain of three media servers, the delay introduced by processing on the media servers might in the worst case be threefold compared to a scenario in which a single high-capacity central media server is being used. According to existing recommendations, in order to keep users very satisfied, the one-directional (i.e. mouth-to-ear) media delay between users should be no more than 225 ms. If the delay exceeds 300 ms, some of the users will already start becoming dissatisfied. It is not uncommon for a single software-based media server performing media decoding and encoding to add on the order of 100ms to the end-to-end delay that RTP packets experience. Thus, already the presence of three media servers that encode and decode the media is enough to make some of the users dissatisfied. Therefore, it is clear that the media processing topology should not contain too many levels of media servers between any two users.

In addition to increasing the end-to-end latency, an inefficient media processing topology can result in both increased jitter and packet loss. This is because a poorly chosen media processing topology may contain among other things low-quality and congested transport links between data centers, too long chains of media servers and cross-data center links between any two users, and overloaded virtual machines and physical servers.

In view of at least the above-described drawbacks that an inappropriate or static choice of media processing topology can have on the end-to-end media stream quality, the present disclosure provides, in various aspects, a solution that may dynamically construct an optimal media processing topology using a flexible set of policies and which also enables adapting of the topology as needed, taking into account the current status of the distributed cloud environment.

Briefly, the present disclosure provides a mechanism that can be applied to select an optimal media processing unit, such as a data center, optimal media server cluster within the data center, and an optimal media server within a media server cluster to serve a new user joining a multimedia conference session. By a media server cluster, it is referred to a set of media server instances running within a single data center or several data centers. That is, a media server cluster may span over just a single data center or over several data centers. A media server instance is a virtual machine on which media servers are run. Using the selection mechanism according to the present disclosure enables an optimal media processing topology to be built among media servers running in different data centers in a distributed cloud environment. The mechanism can also be used for periodically adjusting the media processing topology as a response to changing operating conditions. The operation of the selection mechanism is guided by a flexible set of policies that can be defined by the service provider.

Figure 6:
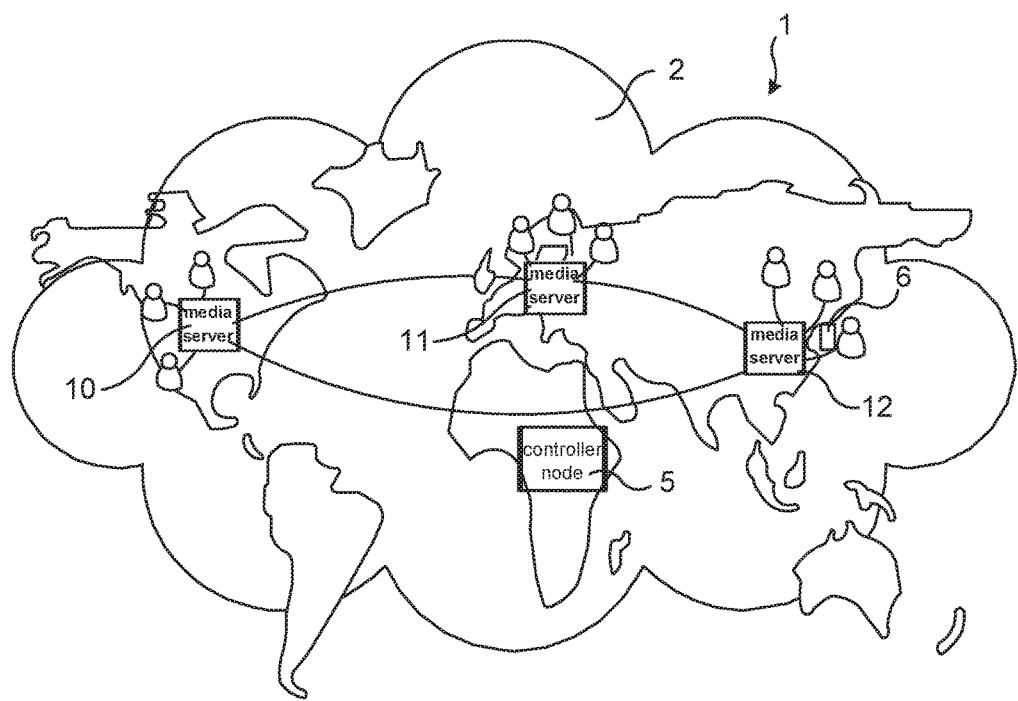
FIG. 6 illustrates an example of a geographically distributed conference session.

FIG. 6 illustrates an example of a distributed real-time multi-media session, and in particular a conference session comprising media streams. The media servers (not illustrated in the figure) used may in the illustrated case be deployed in three data centers 10, 11, 12, the data centers 10, 11, 12 being located in the US, Europe and Asia, respectively. In accordance with prior art, in order to perform media processing as close to the users as possible, end users in Asia would be directed to connect to the media servers in the Asia Data Center 12, end users in US would connect to the US Data Center 10 and end users in Europe would connect to the Europe Data Center 11. However, due to various parameters, such as for instance transport link cost, quality demands, bandwidth, processing capacity, used media encoding, etc., it might be that in certain cases it would be better for a user in Asia to connect directly to a media server in e.g. Europe. This might for instance be due to the fact that every media server adds latency to the media stream, especially if the media stream needs to be decoded and/or encoded. Therefore, to keep latency low, it might be beneficial to keep the number of media servers handling the media stream as low as possible.

When media processing takes place in a geographically distributed data center environment, such as the one illustrated in FIG. 6, media server instances can be placed dynamically in the different data centers 10, 11, 12 making up the distributed cloud based on where conference participants are located. New instances of media servers may be created to handle traffic as the load of existing media server instances increases. When traffic volumes are low, the number of media server instances can be decreased. When a maximum number of media server instances have been created in a data center and all media server instances are fully loaded, new media sessions need to be redirected to alternative data centers, even if the media quality will not be optimal.

Many media servers may be present for one media session such as within one large-scale distributed conference. Whenever a new user joins the conference, a decision needs to be made to which media server the user is connected or whether the user needs to be connected to a new data center which has no previous media server instances. The resulting interconnection topology of the media servers can be highly complex. Thus, a careful selection procedure needs to be followed when connecting users and new media servers serving them to the conference's media processing topology. In the following, a media processing unit selection procedure according to aspects of the present disclosure is described. A media processing unit may for example be a data center or a media server. In the following, data center is used as an example of such media processing unit, in order to describe the selection mechanism.

Selecting Data Center

As described earlier, when a new end user wishes to join a conference, an optimal data center to which to connect the user should be determined. In a distributed cloud environment, there are typically multiple alternative data centers available for serving the user. As an example, a user joining a conference from her mobile phone using a cellular Internet connection might be connected to one of several small nearby data centers running within the radio access network, or to virtualized edge routers capable of running media server instances, or to any number of larger data centers running in different locations in the distributed cloud environment.

Whenever multiple data centers are available for serving the user, a selection process may be applied to select the optimal data center from among the set of candidate data centers. There are multiple policies, in particular multiple parameters, which can influence the choice of data center the new user should be connected to. Such policies may, but are not limited to, comprise one or more of the following:

- Transport quality, e.g. comprising: point-to-point latency between the user and the candidate data center; average end-to-end latency between the user and other users in the conference if connecting the user to this candidate data center; jitter that the user would experience if connecting to this candidate data center; network throughput between the user and the candidate data center.
- Processing, for example, what is the existing media encoding method within the existing media session and what does the new end user prefer.
- Cost of transport links; transport links may have different monetary cost associated with them. As an example, transport links running over the best-effort Internet might be free to use but have low quality, whereas dedicated Virtual Private Network (VPN) connections between data centers are expensive to use but offer high throughput and quality.

Capacity of transport links; as an example, a trans-oceanic transport link available between two data centers might have a very limited capacity. Thus, it might be beneficial to connect users located at one end of the transport link to a data center at the same end of the link that can aggregate traffic from multiple users before it is passed on to the transport link. An advantage of doing this is improved link utilization.

Topology constraints such as the maximum number of levels in a tree topology created between media servers.

Current system load; load and capacity of the available media server instances in the candidate data center.

Capabilities, comprising media server capabilities such as e.g. available codecs and capability to perform transcoding or video bitrate adaptation, and end user communication device capabilities.

Security, e.g. availability of secure (encrypted) links for inter-data center traffic.

Availability of media servers within the data center. As an example, if a data center does not yet have any media server virtual machines, and if the cost to create a new media server cluster is high, e.g. in terms of latency, it might be preferable to connect the user to a data center that is already running a media server cluster.

Cost of using a data center; as an example, it may be more expensive to use a small data center located in a virtualized RAN site than it is to use a large central data center. As another example, during the office hours in Europe, it might be cheaper to use a data center located in the US than a data center in Europe due to the time difference. In particular, since it is night time in the US, the US data centers may have plenty of spare capacity that may thus be cheaper to utilize assuming that the data center provider applies dynamic pricing.

The number of different policies, in particular parameters, that need to be considered when selecting a data center to serve the user may vary and be dependent on the specific deployment.

In the data center selection process, each of the above-mentioned policies (parameters) may carry a different weight. A policy considered as very important has a high weight, whereas a policy deemed less important has a lower weight. The policies/parameters may thus be ordered in view of its importance for the operator. The values of the weights may depend on the preferences of the service provider, application, and/or end customer. In this way, the policies define the importance of certain aspects of a media session. As an example, in some cases, a low cost of transport links might be more important than transport quality, i.e. best effort transport links may be preferred over VPN links in low-priority enterprise-internal conferences, whereas in other cases the situation is the opposite (cost of transport may not be an issue for high-priority enterprise conferences where also customers of the enterprise are participating). The parameter "cost of transport link" is thus given a high weight in the former example and the parameter is given a low weight in the latter example.

As described above, every policy (e.g. system load of a data center) has a weight and a numerical value (e.g. a value of "80%" if the policy relates to the load of a data center, i.e. data center is loaded up to 80% of its capacity). Using the weights and normalized values of the policies, an overall score can be calculated for each data center to which a new user could potentially connect. After this, the data center having the highest score can be selected for serving the user. If the selected data center does not yet have any media server instances running in it, a new media server cluster is created in the data center. By following this selection mechanism, an optimal topology of media server instances running in different data centers is created.

Figure 7:
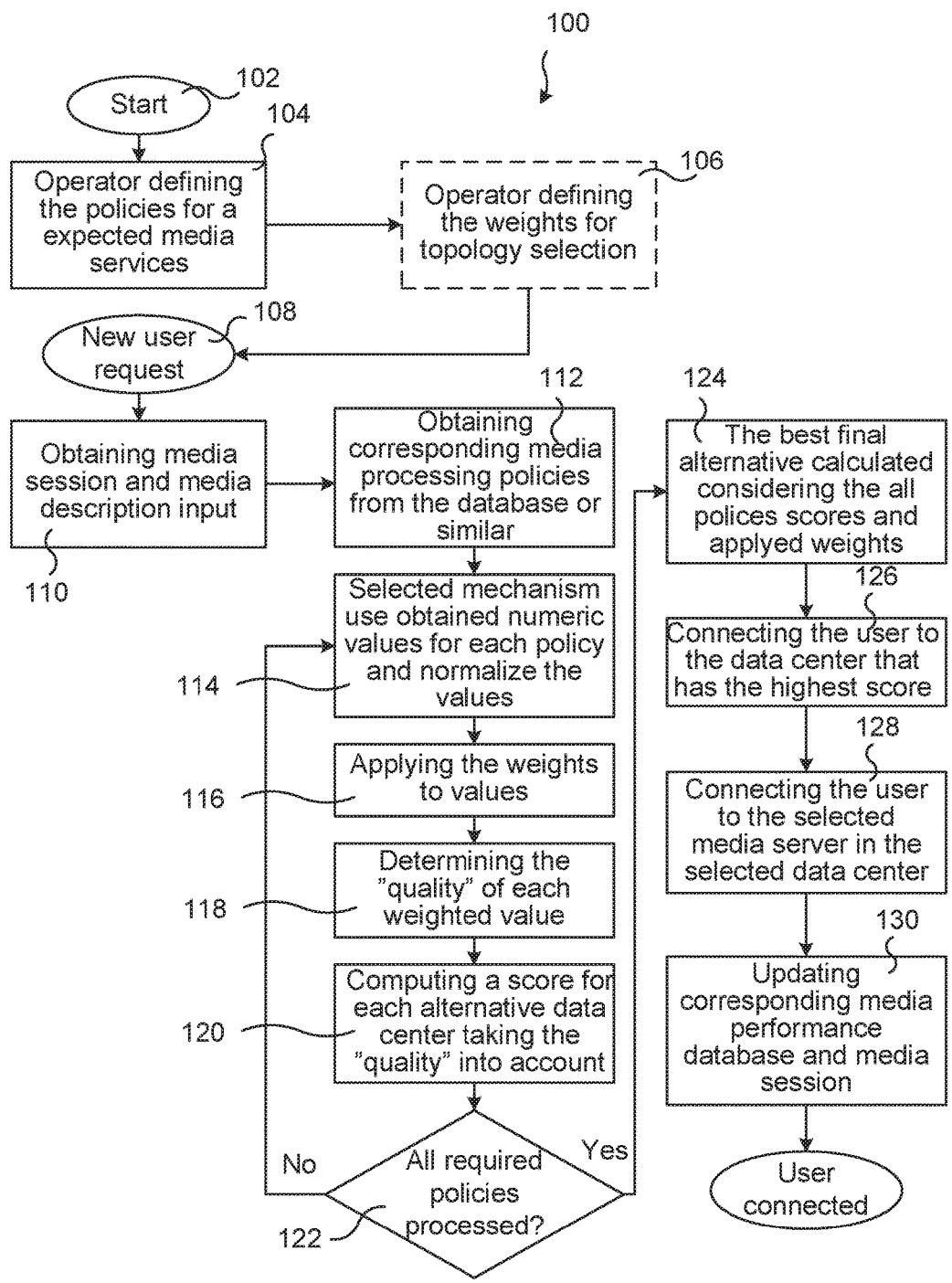
FIG. 7 is a flow chart illustrating operations performed in a network node in accordance with the present disclosure.

The described media processing unit (exemplified by data center) selection procedure is described in more detail in the following, with reference to FIG. 7. FIG. 7 is a flow chart illustrating steps in a data center selection procedure 100 according to aspects of the present teachings. The procedure 100 may be implemented in and performed by a network node, such as for example the controller node 5 of FIGS. 1 and 6 or a dedicated conference controller.

The procedure 100 starts in box 102, wherein a topology definition or selection process is initiated.

In box 104, an operator of the distributed cloud environment 2 defines the policies (i.e. parameters) to be used in the data center selection procedure for an expected media service, e.g. a planned media conference with multiple participants. In the following conference is used as an example of media service. As explained earlier, the defining of policies may be made in view of various optimization aspects and may be very different for different operators.

In box 106, which is an optional step, the operator may define a weight value for each of the policies defined in the previous step.

In box 108, a new user wishes to join the conference.

In box 110, the network node determines, e.g. based on input received from the user in the previous step (box 108), to which conference the user should be connected or whether a new conference should be created. Conventional call control may be used for implementing this step, comprising e.g. obtaining media session and media description input.

In box 112, the network node fetches, for the determined conference, the policies that the service provider has defined and the weights of the policies, if any, from a database or similar system. This may be implemented as a topology controller function in the network node.

In box 112, the network node (e.g. as a part of the topology controller function) determines the full set of candidate data centers to which the joining user can be connected.

Then the following steps (corresponding to boxes 114, 116, 118, 120) are carried out for each candidate data center:

In box 114, the network node 5 obtains a numeric value for each of the policies, i.e. for each of the parameters. As an example, the network node 5 may check the system load of the present candidate data center or the existing media server clusters running in it. Some of the parameters may be so-called on/off parameters. An example of an on/off parameter is transcoding support: either the data center supports transcoding (in which case the value is "on") or it does not support transcoding (the value is "off"). The numerical value for the "on" value is 1 and the numerical value for the "off" value is 0. The network node 5 may further normalize the values of all parameters for the present candidate data center. An example of the normalization procedure is described later.

In box 116, the network node 5 applies the weights, if any, to the numeric values of all of the parameters of the data center.

In box 118, the network node 5 determines the "quality" prefix of the parameters. "Quality" refers to the fact whether a higher value is better for the parameter than a lower value or vice versa. If a higher value is preferred, then the quality prefix is positive (+). If a lower value is preferred, the quality prefix is negative (−). As an example, for system load, a low value is typically preferred in the selection process. In contrast, for throughput, a high value is preferred. An example of the use of the "quality" prefix is described later.

In box 120, the network node 5 computes a score for each parameter by multiplying the normalized value with the relative weight and by applying the quality prefix (plus or minus sign) to the result. Finally, the network node 5 sums up the scores of every individual parameter to form a score for the present candidate data center.

The steps of boxes 114, 116, 118, 120 are performed once (only one policy defined by operator) or repeated for each policy that the operator has defined. If, in box 122, it is determined that all required policies have been processed, the flow continues to box 124.

In box 124, having calculated a score for each candidate data center, the network node 5 selects the data center with the highest score. If the selected data center does not yet have any existing media servers, the network node 5 creates a new media server cluster in the selected data center.

In box 126, the network node 5 connects the user to the selected data center, i.e. the data center that has the highest score.

In box 128, the network node 5 connects the user to a media server cluster in the selected data center. A procedure for media server cluster selection is described later. The network node 5 connects the user to one media server within the media server cluster. A procedure for media server selection is described later.

In box 130, the network node 5 updates the corresponding media performance database (compare step 112) and media session. This enables a dynamically changing media server, wherein e.g. data center may be changed for participating users when a new user enters or an existing user exits the conference.

A particular example of the media processing unit selection procedure is given next, again using data center as the media processing unit to be selected, wherein the distributed cloud shown in FIG. 6 is running a distributed conference service. The three data centers 10, 11, 12 are located in Kansas City in the US, in Frankfurt in Europe, and in Beijing in China. Let us further assume that there is a user, Ning, located nearby Beijing who wants to join an ongoing conference. The policies (i.e. parameters) that the service provider of the conference service has defined for the data center selection procedure are in this example as follows:

- Point-to-point latency between the joining user and the candidate data center (DC), e.g. measured in milliseconds (ms)
- Average end-to-end (E2E) latency between the joining user and the existing users in the conference if using the candidate data center in question
- Load of the media server clusters in the candidate data center
- Relative cost (in terms of money) of using the candidate data center
- Average jitter between the joining user and the existing users in the conference if using the candidate data center
- Maximum number of levels in the tree topology if using the candidate data center
- Estimated average packet loss for the joining user if using the candidate data center
- Availability of support for video stream transrating in the candidate data center (a so-called on/off parameter)
- Throughput between the joining user and the candidate data center Table 1 of FIG. 11 shows an example of the scoring process for the three data centers assuming the above-mentioned policies (i.e. parameters).

The process to calculate the scores of data centers as recorded in Table 1 of FIG.11 is as follows. First, every parameter (as defined in the uppermost row) is assigned a weight value between 1 and 5 (this range of weight values is only used as an example). Every parameter is also assigned a quality (plus or minus). A relative weight is calculated for each parameter by dividing the weight with the sum of all weights and by applying the quality (plus or minus sign) to the parameter. For example, performing this for the parameter "Latency to this DC [ms]" yields: $1/(+5+4+3+4+2+2+4+5)*(-1)=-1/30=-0.0333$.

Next, every value of every parameter (such as latency) is normalized by dividing each individual value with the sum of the individual values of all the data centers 10, 11, 12. For example, performing this for the parameter "Latency to this DC [ms]" yields for Beijing: $50/(50+150+100)=0.1667$, i.e. normalized score of 0.1667.

After this, a score is calculated for each parameter by multiplying the normalized value of the parameter by the relative weight. For example, performing this for the parameter "Latency to this DC [ms]" yields for data center 12 in Beijing: $0.1667*(-0.0333)=-0.0056$.

Finally, the scores of every parameter for a given data center are summed up to get the score of the data center. For example, performing this for the Beijing data center 12 yields: $-0.0056+(0.0480)+(-0.073)+(-0.0263)+(-0.02963)+(-0.02667)+(-0.033)+0+0.083333=-045$. In this case, the data center 10 in Kansas City has the highest score (−0.08) and is therefore selected to serve Ning.

Media Server Cluster/Media Server Selection

The media processing unit selection mechanism described above, in which data center was used as an example of the media processing unit, can also be applied to selecting one media server cluster from among multiple candidate media server clusters running within, for instance, a single data center. When using the media processing unit selection mechanism for media server cluster selection, different policies may need to be applied; some of the policies used for data center selection may not be relevant media server cluster selection (e.g. the policy related to cost of a data center). Further, additional relevant policies may be applied to the problem of media server cluster selection (e.g., the number of lightly loaded or unloaded media servers within a cluster).

Still further, the method for selecting media processing unit can be applied for various purposes, including but not limited to data center, media server cluster, media server, and transport link selection.

The media processing unit selection mechanism can also be applied to selecting one media server virtual machine from among all the media server virtual machines making up a media server cluster.

Transport Link Selection

In a scenario where there are multiple alternative transport links between a pair of data centers (e.g. a transport link over best-effort Internet, an Multi-Protocol Label Switching Virtual Private Network (MPLS VPN) link, a dedicated fiber connection, or even a satellite link), the selection procedure described earlier can be used to select the best link to use for a media stream or a set of media streams.

So far, how to execute the selection procedure when a new user joins a multimedia conference has been described. Another example of a use case for the selection procedure is to re-execute the procedure periodically in order to adjust the media processing topology as a response to changing operating conditions. In such a case, the selection procedure is used to re-calculate new scores for the media processing unit, e.g. the data centers (and/or media server clusters, media servers, transport links) based on the latest performance parameters (e.g. system load, end-to-end latency, throughput, packet loss, jitter, and so forth). If the result of re-executing the selection mechanism is that some of the old topology decisions are no longer optimal, measures can be taken to adjust the topology. As an example, traffic between data centers may be switched from one transport link to another transport link, the media format used between two data centers may be changed, or a media server may be bypassed in a tree topology by transferring processing to another media server at a different level in the tree. The selection method may thus be a dynamic run-time adjusted media processing topology selection method.

Figure 8:
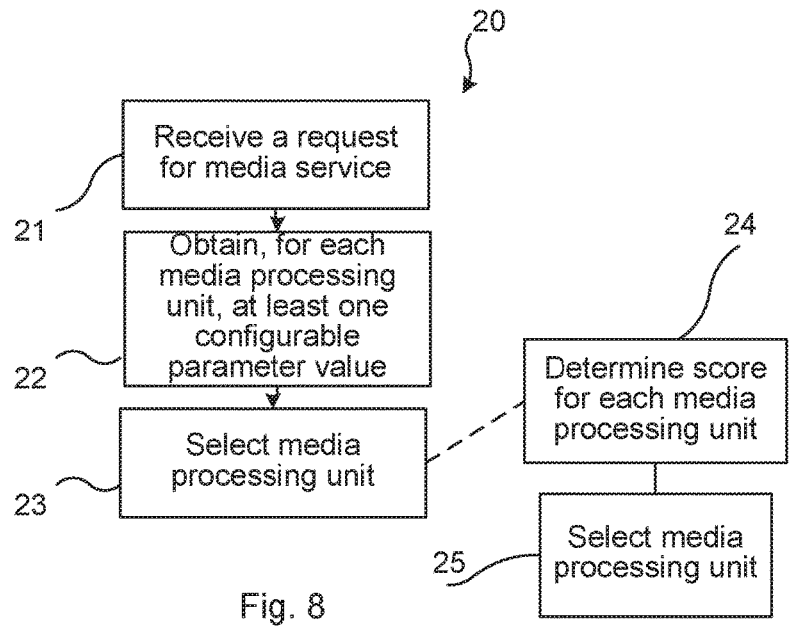
FIG. 8 illustrates a flow chart over steps of a method in a network node in accordance with the present disclosure.

FIG. 8 illustrates a flow chart over steps of a method 20 in a network node 5 in accordance with the present disclosure. The method 20 for selecting a media processing unit 3, 3A, 3B, 3D; 4, 4A, 4B, 4D; 10, 11, 12 may thus be performed in a network node 5 of a distributed cloud 2. The distributed cloud 2 comprises two or more media processing units 3, 3A, 3B, 3D; 4, 4A, 4B, 4D; 10, 11, 12 configurable to handle media processing required by a media service.

The method 20 comprises receiving 21, from a communication device 6, 6A, 6B, 6C, 6D, a request for the media service. The communication device 6, 6A, 6B, 6C, 6D may for example comprise a smart phone, cell phone, a laptop computer, personal computer, video conferencing devices or any other end user equipment. The media service may for example be a multi-party conference call, or video call. The receiving of such request may be handled in conventional way, e.g. involving steps such as authenticating the user, determining to which conference the user should be connected, generating a response to the user, routing the request to a next hop destination etc.

The method 20 comprises obtaining 22, for each media processing unit 3, 3A, 3B, 3D; 4, 4A, 4B, 4D; 10, 11, 12, at least one configurable parameter value of a parameter relating to handling of the media service. Several examples of such configurable parameter values have been given, and may for example relate to media processing of the media service.

The method 20 comprises selecting 23, based on the at least one parameter value, a media processing unit 3, 3A, 3B, 3D; 4, 4A, 4B, 4D; 10, 11, 12 for processing the requested media service for the communication device 6, 6A, 6B, 6C, 6D.

In an embodiment, the selecting 23 comprises:
determining 24, for each media processing unit 3, 3A, 3B, 3D; 4, 4A, 4B, 4D; 10, 11, 12, a score by summing all parameter values for a respective media processing unit 3, 3A, 3B, 3D; 4, 4A, 4B, 4D; 10, 11, 12, the respective sum constituting a respective score for each media processing unit 3, 3A, 3B, 3D; 4, 4A, 4B, 4D; 10, 11, 12, and
selecting 25 the media processing unit 3, 3A, 3B, 3D; 4, 4A, 4B, 4D; 10, 11, 12 having the highest score.

In a variation of the above embodiment, the determining 24 for each media processing unit 3, 3A, 3B, 3D; 4, 4A, 4B, 4D; 10, 11, 12 a score comprises normalizing each parameter value by dividing the respective parameter value for a particular media processing unit with the sum of all the corresponding parameter values for all media processing units 3, 3A, 3B, 3D; 4, 4A, 4B, 4D; 10, 11, 12.

In other variations, the obtaining 22, for each media processing unit 3, 3A, 3B, 3D; 4, 4A, 4B, 4D; 10, 11, 12, at least one configurable parameter value further comprises obtaining for each parameter a weight corresponding to an importance of the parameter and wherein the determining 24 is further based on the weight.

In an embodiment, the selecting 23 comprises:
determining 24 for each of the two or more media processing units 3, 3A, 3B, 3D; 4, 4A, 4B, 4D; 10, 11, 12 a score by:
obtaining, for each parameter, a numerical weight value corresponding to an importance of the parameter and a quality indicator comprising the value one or minus 1,
determining, for each parameter, a relative numerical weight value by dividing the obtained numerical weight value of the parameter with the sum of all numerical weight values for the parameter and multiplying the result with the quality indicator,
normalizing each obtained parameter value for each media processing unit 3, 3A, 3B, 3D; 4, 4A, 4B, 4D; 10, 11, 12 by dividing the respective parameter value for a particular media processing unit 3, 3A, 3B, 3D; 4, 4A, 4B, 4D; 10, 11, 12 with the sum of all the corresponding parameter values for all media processing unit 3, 3A, 3B, 3D; 4, 4A, 4B, 4D; 10, 11, 12, providing normalized parameter values for each media processing unit 3, 3A, 3B, 3D; 4, 4A, 4B, 4D; 10, 11, 12,
determining, for each obtained parameter value for each media processing unit 3, 3A, 3B, 3D; 4, 4A, 4B, 4D; 10, 11, 12, a weighted normalized score by multiplying the respective normalized parameter value with the respective relative numerical weight value,
summing, for each media processing unit 3, 3A, 3B, 3D; 4, 4A, 4B, 4D; 10, 11, 12, the weighted normalized scores for all parameters, providing a score for each media processing unit, and
selecting 25 the media processing unit 3, 3A, 3B, 3D; 4, 4A, 4B, 4D; 10, 11, 12 having the highest score.

In an embodiment, the media processing unit comprises a data center 4, 4A, 4B, 4D; 10, 11, 12 and the method 20 comprises:
determining that a maximum number of media server instances have been created in the selected data center 4, 4A, 4B, 4D; 10, 11, 12 and that all media server instances are fully loaded,
selecting the data center 4, 4A, 4B, 4D; 10, 11, 12 having the next highest score, and
connecting the communication device 6, 6A, 6B, 6C, 6D to a media server instance of the selected data center 4, 4A, 4B, 4D; 10, 11, 12.

In an embodiment, the media processing unit comprises a data center 4, 4A, 4B, 4D; 10, 11, 12 and the method 20 comprises:
selecting an existing media server instance of the selected data center 4, 4A, 4B, 4D; 10, 11, 12 or creating a new media server instance in the selected data center 4, 4A, 4B, 4D; 10, 11, 12, and
connecting the communication device 6, 6A, 6B, 6C, 6D to the selected existing media server instance or to the created new media server instance.

In a variation of the above embodiment, the selecting an existing media server instance is based on one or more of: load of a media server instance, capabilities of a media server instance, number of media server instances within a media server cluster, existing sessions served by the media server instance, capabilities of hardware on which the media server instance is running (e.g. virtualized hardware), connectivity, bandwidth and operational state.

In an embodiment, the media processing unit comprises a data center 4, 4A, 4B, 4D; 10, 11, 12 and the method 20 comprises connecting the communication device 6, 6A, 6B, 6C, 6D to a media server instance of the selected data center 4, 4A, 4B, 4D; 10, 11, 12 and adapting the number of media server instances based on traffic load, by creating a new media server instance upon determining that load of existing media server instances is above a first threshold and removing a media server instance upon determining that load of existing media server instances is below a second threshold.

In an embodiment, the method 20 comprises evaluating configuration of selected media processing unit 3, 3A, 3B, 3D; 4, 4A, 4B, 4D; 10, 11, 12 for all communication devices 6, 6A, 6B, 6C, 6D participating in the media service upon a communication device 6, 6A, 6B, 6C, 6D disconnecting from the media service, or upon a communication device 6, 6A, 6B, 6C, 6D connecting to the media service, or upon receiving information pertaining to a link failure or data center failure, or periodically (e.g. upon expiration of a timer) and performing reselection of media processing unit 3, 3A, 3B, 3D; 4, 4A, 4B, 4D; 10, 11, 12 (or data center 4, 4A, 4B, 4D; 10, 11, 12) for one or more communication devices 6, 6A, 6B, 6C, 6D participating in the media service when the evaluation establishes that such reselection improves performance.

In an embodiment, the selecting 23 of media processing unit 3, 3A, 3B, 3D; 4, 4A, 4B, 4D; 10, 11, 12 is based on parameter values of at least one parameter chosen among: transport quality, media service processing, cost of transport links, capacity of transport links, topology constraints, current system load, media server capabilities, end user communication device capabilities, security, availability of media servers within the data center, cost of using a data center, location.

It is noted that the media processing unit 3, 3A, 3B, 3D; 4, 4A, 4B, 4D; 10, 11, 12 may comprise e.g. a data center, media server or a media server instance and that the various embodiments of the method described may be used e.g. to select a data center.

Figure 9:
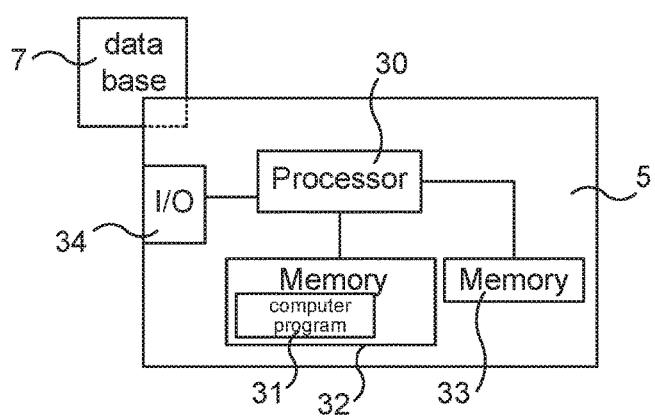
FIG. 9 illustrates schematically a network node and means for implementing methods of the present disclosure.

FIG. 9 illustrates schematically a network node and means for implementing methods of the present disclosure. In particular, a network node is illustrated and exemplified by the previously mentioned controller node 5. The network node 5 may be arranged to receive control signaling from the media servers 3, 3A, 3B, 3D; 10, 11, 12, such as control signaling relating to interconnection of media servers, for instance indicating to one media server that it should forward a media stream in a certain format to another media server. Other examples of such control signaling comprises ordering a media server to carry out a media processing operation, e.g. transcoding, to a particular media stream, or instructing the media server to mix several audio streams received from users into one mixed audio stream. The network node 5 may be arranged to perform various tasks such as create or find an existing media server virtual machine in various data centers, configured to perform the described methods and procedures. The network node 5 may be configured to provide an interconnection topology that is optimal in some sense, e.g. distributing the media servers within the distributed cloud in view of optimizing the media stream with regard to one or more parameters such as e.g. latency, link capacity etc. The controller node 5 may also be configured to distribute the media processing within the cloud.

The network node 5 comprises an interface device 34 towards other network nodes of the distributed cloud 2, for example the data centers 4, 4A, 4B, 4D; 10, 11, 12. In the figure such interface 34 is indicated by an input/output (I/O) device. The network node 5 may thus communicate with other network nodes of the distributed cloud 2 by means of the interface device 34. The communication may entail receiving and transmitting data from and to the other network nodes. The interface device 34 is configured to convey such communication to a processor 30.

The network node 5 may also comprise a database 7, or be configured to retrieve data from such database 7. That is, the database 7 may be part of the network node 5, or be connected to the network node 5. The database 7 may comprise all the various policies (parameters) based on which the selection is made. An operator may thus have access to the database 7 for inputting relevant data.

The network node 5 thus also comprises a processor 30 comprising any combination of one or more of a central processing unit (CPU), multiprocessor, microcontroller, digital signal processor (DSP), application specific integrated circuit etc. capable of executing software instructions stored in a memory 32, which can thus be a computer program product 32. The processor 30 can be configured to execute any of the various embodiments of the method as has been described, e.g. as described in relation to FIG. 8.

In particular, a network node 5 for selecting a media processing unit 3, 3A, 3B, 3D; 4, 4A, 4B, 4D; 10, 11, 12 of a distributed cloud 2 is provided. The distributed cloud 2 comprises two or more media processing units 3, 3A, 3B, 3D; 4, 4A, 4B, 4D; 10, 11, 12 configurable to handle media processing required by a media service. The network node 5 comprises a processor 30 and memory 32, the memory 32 containing instructions executable by the processor 30, whereby the network node 5 is operative to:

receive, from a communication device 6, 6A, 6B, 6C, 6D, a request for the media service, obtain, for each media processing unit 3, 3A, 3B, 3D; 4, 4A, 4B, 4D; 10, 11, 12, at least one configurable parameter value of a parameter relating to handling of the media service, and select, based on the at least one parameter value, a media processing unit 3, 3A, 3B, 3D; 4, 4A, 4B, 4D; 10, 11, 12 for processing the requested media service for the communication device 6, 6A, 6B, 6C, 6D.

In an embodiment, the network node 5 is configured to select by:

determining, for each media processing unit 3, 3A, 3B, 3D; 4, 4A, 4B, 4D; 10, 11, 12, a score by summing all parameter values for a respective media processing unit 3, 3A, 3B, 3D; 4, 4A, 4B, 4D; 10, 11, 12, the respective sum constituting a respective score for each media processing unit 3, 3A, 3B, 3D; 4, 4A, 4B, 4D; 10, 11, 12, and select the media processing unit 3, 3A, 3B, 3D; 4, 4A, 4B, 4D; 10, 11, 12 having the highest score.

In a variation of the above embodiment, the network node 5 is configured to determine for each media processing unit 3, 3A, 3B, 3D; 4, 4A, 4B, 4D; 10, 11, 12 a score by normalizing each parameter value by dividing the respective parameter value for a particular media processing unit with the sum of all the corresponding parameter values for all media processing unit 3, 3A, 3B, 3D; 4, 4A, 4B, 4D; 10, 11, 12.

In other variations, the network node 5 is configured to obtain, for each media processing unit 3, 3A, 3B, 3D; 4, 4A, 4B, 4D; 10, 11, 12, at least one configurable parameter value by further obtaining for each parameter a weight corresponding to an importance of the parameter and wherein the network node 5 is configured to determine further based on the weight.

In an embodiment, the network node 5 is configured to select by:
- determining for each of the two or more media processing units 3, 3A, 3B, 3D; 4, 4A, 4B, 4D; 10, 11, 12 a score by:
  - obtaining, for each parameter, a numerical weight value corresponding to an importance of the parameter and a quality indicator comprising the value one or minus 1,
  - determining, for each parameter, a relative numerical weight value by dividing the obtained numerical weight value of the parameter with the sum of all numerical weight values for the parameter and multiplying the result with the quality indicator,
  - normalizing each obtained parameter value for each media processing unit 3, 3A, 3B, 3D; 4, 4A, 4B, 4D; 10, 11, 12 by dividing the respective parameter value for a particular media processing unit 3, 3A, 3B, 3D; 4, 4A, 4B, 4D; 10, 11, 12 with the sum of all the corresponding parameter values for all media processing unit 3, 3A, 3B, 3D; 4, 4A, 4B, 4D; 10, 11, 12, providing normalized parameter values for each media processing unit 3, 3A, 3B, 3D; 4, 4A, 4B, 4D; 10, 11, 12
  - determining, for each obtained parameter value for each media processing unit 3, 3A, 3B, 3D; 4, 4A, 4B, 4D; 10, 11, 12, a weighted normalized score by multiplying the respective normalized parameter value with the respective relative numerical weight value,
  - summing, for each media processing unit 3, 3A, 3B, 3D; 4, 4A, 4B, 4D; 10, 11, 12, the weighted normalized scores for all parameters, providing a score for each media processing unit, and
- selecting the media processing unit 3, 3A, 3B, 3D; 4, 4A, 4B, 4D; 10, 11, 12 having the highest score.

In an embodiment, the media processing unit (3, 3A, 3B, 3D; 4, 4A, 4B, 4D; 10, 11, 12) comprises a data center (4A, 4B, 4D; 10, 11, 12) configured to:
- determine that a maximum number of media server instances have been created in the selected data center 4, 4A, 4B, 4D; 10, 11, 12 and that all media server instances are fully loaded,
- select the data center 4, 4A, 4B, 4D; 10, 11, 12 having the next highest score, and
- connect the communication device 6, 6A, 6B, 6C, 6D to a media server instance of the selected data center 4, 4A, 4B, 4D; 10, 11, 12.

In an embodiment, the media processing unit comprises a data center 4, 4A, 4B, 4D; 10, 11, 12 and the network node 5 is configured to:
- select an existing media server instance of the selected data center 4, 4A, 4B, 4D; 10, 11, 12 or creating a new media server instance in the selected data center 4, 4A, 4B, 4D; 10, 11, 12, and
- connect the communication device 6, 6A, 6B, 6C, 6D to the selected existing media server instance or to the created new media server instance.

In a variation of the above embodiment, the network node 5 is configured to select an existing media server instance based on one or more of: load of a media server instance, capabilities of a media server instance, number of media server instances within a media server cluster, existing sessions served by the media server instance, capabilities of hardware on which the media server instance is running (e.g. virtualized hardware), connectivity, bandwidth and operational state.

In an embodiment, the media processing unit comprises a data center 4, 4A, 4B, 4D; 10, 11, 12 and the network node 5 is configured to connect the communication device 6, 6A, 6B, 6C, 6D to a media server instance of the selected data center 4, 4A, 4B, 4D; 10, 11, 12 and configured to adapt the number of media server instances based on traffic load, by creating a new media server instance upon determining that load of existing media server instances is above a first threshold and removing a media server instance upon determining that load of existing media server instances is below a second threshold.

In an embodiment, the network node 5 is configured to evaluate configuration of selected media processing unit 3, 3A, 3B, 3D; 4, 4A, 4B, 4D; 10, 11, 12 for all communication devices 6, 6A, 6B, 6C, 6D participating in the media service upon a communication device 6, 6A, 6B, 6C, 6D disconnecting from the media service, or upon a communication device 6, 6A, 6B, 6C, 6D connecting to the media server, or upon receiving information pertaining to a link failure or media processing unit 3, 3A, 3B, 3D; 4, 4A, 4B, 4D; 10, 11, 12 (e.g. data center) failure, or periodically and configured to perform reselection of media processing unit 3, 3A, 3B, 3D; 4, 4A, 4B, 4D; 10, 11, 12 for one or more communication devices 6, 6A, 6B, 6C, 6D participating in the media service when the evaluation establishes that such reselection improves performance.

In an embodiment, the network node 5 is configured to perform the selecting of media processing unit 3, 3A, 3B, 3D; 4, 4A, 4B, 4D; 10, 11, 12 based on parameter values of at least one parameter chosen among: transport quality, media service processing, cost of transport links, capacity of transport links, topology constraints, current system load, media server capabilities, end user communication device capabilities, security, availability of media servers within the data center, cost of using a data center, location.

It is again noted that the media processing unit 3, 3A, 3B, 3D; 4, 4A, 4B, 4D; 10, 11, 12 may comprise e.g. a data center, media server or a media server instance.

Still with reference to FIG. 9, the memory 32 can be any combination of read and write memory (RAM) and read only memory (ROM). The memory 32 also comprises persistent storage, which, for example, can be any single one or combination of magnetic memory, optical memory, solid state memory or even remotely mounted memory.

A data memory 33 may also be provided for reading and/or storing data during execution of software instructions in the processor 30. The data memory 33 can be any combination of read and write memory (RAM) and read only memory (ROM).

The disclosure of the present application also encompasses a computer program product 32 comprising a computer program 31 for implementing the methods as has described, and a computer readable means on which the computer program 31 is stored. The computer program product 32 may be any combination of read and write memory (RAM) or read only memory (ROM). The computer program product 32 may also comprise persistent storage, which for example can be any single one or combination of magnetic memory, optical memory or solid state memory.

The present disclosure thus comprise a computer program 31 for a network node 5 for selecting a media processing unit 3, 3A, 3B, 3D; 4, 4A, 4B, 4D; 10, 11, 12 of a distributed cloud 2, wherein the distributed cloud 2 comprises two or more media processing units 3, 3A, 3B, 3D; 4, 4A, 4B, 4D; 10, 11, 12 configurable to handle media processing required by a media service. The computer program 31 comprises computer program code, which, when run on the network node 5 causes the network node 5 to: receive, from a communication device 6, 6A, 6B, 6C, 6D, a request for the media service; obtain, for each media processing unit 3, 3A, 3B, 3D; 4, 4A, 4B, 4D; 10, 11, 12 at least one configurable parameter value of a parameter relating to handling of the media service; and select, based on the at least one parameter value, a media processing unit 3, 3A, 3B, 3D; 4, 4A, 4B, 4D; 10, 11, 12 for processing the requested media service for the communication device 6, 6A, 6B, 6C, 6D.

The present disclosure also provides a computer program product 32 comprising a computer program 31 as described above, and a computer readable means on which the computer program 31 is stored. The computer program product 32, or the memory, thus comprises instructions executable by the processor 30. Such instructions may be comprised in a computer program, or in one or more software modules or function modules.

Figure 10:
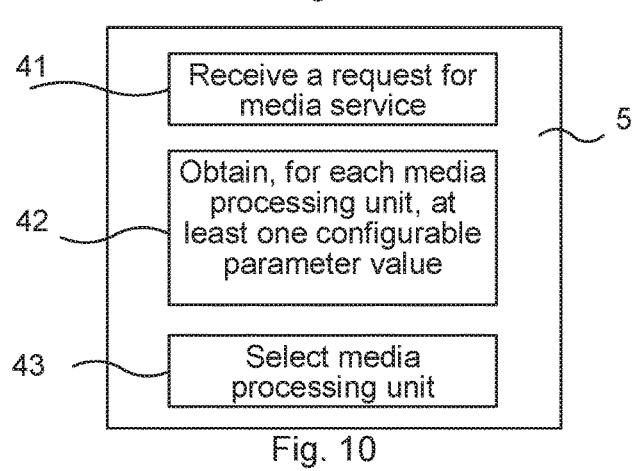
FIG. 10 illustrates a network node comprising function modules/software modules for implementing methods of the present disclosure.

An example of an implementation using function modules/software modules is illustrated in FIG. 10, in particular illustrating network node 5 comprising function modules for implementing methods of the present disclosure. The network node 5 comprises means, in particular a first function module 41, for receiving, from a communication device 6, 6A, 6B, 6C, 6D, a request for the media service. The network node 5 comprises means, in particular a second function module 42, for obtaining, for each media processing unit 3, 3A, 3B, 3D; 4, 4A, 4B, 4D; 10, 11, 12, at least one configurable parameter value of a parameter relating to handling of the media service. The network node 5 comprises means, in particular a third function module 43, for selecting, based on the at least one parameter value, a media processing unit 3, 3A, 3B, 3D; 4, 4A, 4B, 4D; 10, 11, 12 for processing the requested media service for the communication device 6, 6A, 6B, 6C, 6D.

The function modules 41, 42, 43 can be implemented using software instructions such as computer program executing in a processor and/or using hardware, such as application specific integrated circuits, field programmable gate arrays, discrete logical components etc.

Modifications of the disclosed embodiments and other embodiments will come to mind to one skilled in the art having the benefit of the disclosure presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for selecting a media processing unit, the method being performed in a controlling network node of a distributed cloud, the distributed cloud comprising two or more media processing units configured to handle media processing required by a media service, the method comprising:

receiving, from a communication device, a request for the media service;

obtaining, for each of the two or more media processing units, at least one configurable parameter value of a parameter related to handling of the media service, wherein each of the two or more media processing units comprises a data center;

selecting, based on the at least one parameter value, one of the media processing units for processing the requested media service for the communication device, wherein the selecting comprises:

determining, for each media processing unit of the two or more media processing unit, a score by summing all parameter value for a respective media processing unit, the respective sum constituting a respective score for each media processing unit, and the media processing unit having a highest score is selected;

determining that a maximum number of media server instances have been created in the selected data center and that all media server instances are fully loaded;

selecting the data center having the next highest score; and connecting the communication device to a media server instance of the selected data center, for receiving the requested media service.

2. The method of claim 1, wherein determining the score for each media processing unit comprises normalizing each parameter value by dividing the respective parameter value for a particular media processing unit with the sum of all the corresponding parameter values for all media processing units.

3. The method of claim 1, wherein the obtaining, for each media processing unit, at least one configurable parameter value further comprises obtaining for each parameter a weight corresponding to an importance of the parameter and wherein the determining is further based on the weight.

4. The method of claim 1, wherein the selecting comprises determining the score for each of the two or more media processing units by:

obtaining, for each parameter, a numerical weight value corresponding to an importance of the parameter and a quality indicator comprising the value one or minus 1;

determining, for each parameter, a relative numerical weight value by dividing the obtained numerical weight value of the parameter with the sum of all numerical weight values for the parameter and multiplying the result with the quality indicator; normalizing each obtained parameter value for each media processing unit by dividing the respective parameter value for a particular media processing unit with the sum of all the corresponding parameter values for all media processing unit, providing normalized parameter values for each media processing unit;

determining, for each obtained parameter value for each media processing unit, a weighted normalized score by multiplying the respective normalized parameter value with the respective relative numerical weight value;

summing, for each media processing unit, the weighted normalized scores for all parameters, providing a score for each media processing unit; and selecting the media processing unit having the highest score.

5. The method of claim 1, wherein the method comprises:

selecting an existing media server instance of the selected data center or creating a new media server instance in the selected data center; and connecting the communication device to the selected existing media server instance or to the created new media server instance.

6. The method of claim 5, wherein selecting the existing media server instance is based on one or more of: a load of a media server instance, capabilities of a media server instance, number of media server instances within a media server cluster, existing sessions served by the media server instance, capabilities of hardware on which the media server instance is running, connectivity, bandwidth and operational state.

7. The method of claim 1, wherein the method further comprises connecting the communication device to a media server instance of the data center and adapting the number of media server instances based on traffic load, by creating a new media server instance upon determining that a load of existing media server instances is above a first threshold and removing one of the existing media server instances upon determining that the load of the existing media server instances is below a second threshold.

8. The method of claim 1, further comprising evaluating configuration of selected media processing unit for all communication devices participating in the media service upon a communication device disconnecting from the media service, or upon a communication device connecting to the media service, or upon receiving information pertaining to a link failure or the data center failure, or periodically and performing reselection of media processing unit for one or more communication devices participating in the media service when the evaluation establishes that such reselection improves performance.

9. The method of claim 1, wherein the selecting media processing unit is based on parameter values of at least one parameter chosen among: transport quality, media service processing, cost of transport links, capacity of transport links, topology constraints, current system load, media server capabilities, end communication device capabilities, security, availability of media servers within the data center, cost of using a data center, location.

10. The method of claim 1, wherein the media processing unit comprises a media server.

11. A network node configured for selecting a media processing unit of a distributed cloud, the distributed cloud comprising two or more media processing units configured to handle media processing required by a media service, the network node comprising a processor and memory, the memory containing instructions executable by the processor, whereby the network node is operative to:
receive, from a communication device, a request for the media service,
obtain, for each of the two or more media processing units, at least one configurable parameter value of a parameter related to handling of the media service, wherein each of the two or more media processing units comprises a data center;
select, based on the at least one parameter value, one of the media processing units for processing the requested media service for the communication device;
connect the communication device to the selected media processing unit, for receiving the requested media service;
select an existing media server instance of the selected data center or creating a new media server instance in the selected data center, and
connect the communication device to the selected existing media server instance or to the created new media server instance.

12. The network node of claim 11, wherein the instructions are such that the network node is operative to select by:
determining, for each media processing unit, a score by summing all parameter values for a respective media processing unit, the respective sum constituting a respective score for each media processing unit, and
select the media processing unit having the highest score.

13. The network node of claim 12, wherein the instructions are such that the network node is configured to determine the score for each media processing unit by normalizing each parameter value by dividing the respective parameter value for a particular media processing unit with the sum of all the corresponding parameter values for all media processing units.

14. The network node of claim 11, wherein the instructions are such that the network node is configured to obtain, for each media processing unit, at least one configurable parameter value by further obtaining for each parameter a weight corresponding to an importance of the parameter and wherein the network node is configured to determine further based on the weight.

15. The network node of claim 11, wherein the instructions are such that the network node is configured to select by:
obtaining, for each parameter, a numerical weight value corresponding to an importance of the parameter and a quality indicator comprising the value one or minus 1;
determining, for each parameter, a relative numerical weight value by dividing the obtained numerical weight value of the parameter with the sum of all numerical weight values for the parameter and multiplying the result with the quality indicator;
normalizing each obtained parameter value for each media processing unit by dividing the respective parameter value for a particular media processing unit with the sum of all the corresponding parameter values for all media processing unit, providing normalized parameter values for each media processing unit;
determining, for each obtained parameter value for each media processing unit, a weighted normalized score by multiplying the respective normalized parameter value with the respective relative numerical weight value,
summing, for each media processing unit, the weighted normalized scores for all parameters, providing a score for each media processing unit, and
selecting the media processing unit having the highest score.

16. The network node of claim 11, wherein the media processing unit is configured to:
determine that a maximum number of media server instances have been created in the selected data center and that all media server instances are fully loaded,
select the data center having the next highest score, and
connect the communication device to a media server instance of the selected data center.

17. The network node of claim 11, wherein the instructions are such that the network node is configured to select an existing media server instance based on one or more of: a load of a media server instance, capabilities of a media server instance, number of media server instances within a media server cluster, existing sessions served by the media server instance, capabilities of hardware on which the media server instance is running, connectivity, bandwidth and operational state.

18. The network node of claim 11, wherein the instructions are such that the network node is configured to connect the communication device to a media server instance of the selected data center and configured to adapt the number of media server instances based on traffic load, by creating a new media server instance upon determining that a load of existing media server instances is above a first threshold and removing one of the existing media server instances upon determining that the load of the existing media server instances is below a second threshold.

19. The network node of claim 11, wherein the instructions are such that the network node is configured to evaluate configuration of selected media processing unit for all communication devices participating in the media service upon a communication device disconnecting from the media service, or upon a communication device connecting to the media service, or upon receiving information pertaining to a link failure or the data center failure, or periodically, and configured to perform reselection of media processing unit for one or more communication devices participating in the media service when the evaluation establishes that such reselection improves performance.

20. The network node of claim 11, wherein the instructions are such that the network node is configured to perform the selecting of media processing unit based on parameter values of at least one parameter chosen among: transport quality, media service processing, cost of transport links, capacity of transport links, topology constraints, current system load, media server capabilities, end user communication device capabilities, security, availability of media servers within the data center, cost of using a data center, location.

21. The network node of claim 11, wherein the media processing unit comprises a media server.

22. A non-transitory computer-readable medium comprising, stored thereupon, a computer program for a network node for selecting a media processing unit of a distributed cloud, wherein the distributed cloud comprises two or more media processing units configured to handle media processing required by a media service, the computer program comprising computer program code, which, when run on the network node causes the network node to:
  receive, from a communication device, a request for the media service,
  obtain, for each of the two or more media processing units, at least one configurable parameter value of a parameter related to handling of the media service,
  wherein each of the two or more media processing units comprises a data center,
  select, based on the at least one parameter value, one of the media processing units for processing the requested media service for the communication device;
  connect the communication device to the selected media processing unit, for receiving the requested media service; and
  connecting the communication device to a media server instance of the data center and adapting the number of media server instances based on traffic load, by creating a new media server instance upon determining that a load of existing media server instances is above a first threshold and removing one of the existing media server instances upon determining that the load of the existing media server instances is below a second threshold.

* * * * *